United States Patent
Gann et al.

[11] Patent Number: 5,726,771
[45] Date of Patent: Mar. 10, 1998

[54] SYSTEM AND METHOD FOR OPTIMIZING TONAL RESOLUTION IN AN OPTICAL SCANNER

[75] Inventors: Robert G. Gann, Bellvue; Robert E. Sobol, Ft. Collins, both of Colo.

[73] Assignee: Hewlett-Packard Company, Palo Alto, Calif.

[21] Appl. No.: 332,210

[22] Filed: Oct. 31, 1994

[51] Int. Cl.$^6$ .................................. H04N 1/40
[52] U.S. Cl. .................. 358/445; 358/446; 382/270; 382/273
[58] Field of Search .................. 358/483, 482, 358/446, 445, 406, 447, 461, 463, 504, 475, 509, 512, 479, 520; 348/229, 255, 222, 300, 297; 382/273, 270

[56] References Cited

U.S. PATENT DOCUMENTS

| | | | |
|---|---|---|---|
| 4,329,717 | 5/1982 | Logie et al. | 358/446 |
| 4,660,082 | 4/1987 | Tomohisa et al. | 358/446 |
| 4,876,605 | 10/1989 | Ishikawa et al. | 382/273 |
| 4,912,558 | 3/1990 | Easterly et al. | 358/446 |
| 5,067,168 | 11/1991 | Nagano | 382/273 |
| 5,084,772 | 1/1992 | Shimoyama | 358/475 |
| 5,224,178 | 6/1993 | Madden et al. | 358/446 |
| 5,228,099 | 7/1993 | Yamada | 382/273 |
| 5,249,068 | 9/1993 | Takasa | 358/475 |
| 5,267,053 | 11/1993 | Poturek et al. | 358/446 |
| 5,278,674 | 1/1994 | Webb et al. | 358/475 |
| 5,282,063 | 1/1994 | Deacon et al. | 358/479 |
| 5,285,293 | 2/1994 | Webb et al. | 358/406 |
| 5,291,307 | 3/1994 | Luckhurst | 382/273 |
| 5,295,204 | 3/1994 | Parulski | 358/479 |
| 5,296,944 | 3/1994 | Suzuki et al. | 358/446 |
| 5,321,528 | 6/1994 | Nakamura | 358/482 |
| 5,331,435 | 7/1994 | Scott | 358/479 |
| 5,343,308 | 8/1994 | Johnston | 358/445 |
| 5,361,140 | 11/1994 | Hayenga et al. | 358/446 |
| 5,363,318 | 11/1994 | McCauley | 358/512 |
| 5,381,245 | 1/1995 | Johnston | 358/487 |
| 5,408,335 | 4/1995 | Takahashi et al. | 358/446 |
| 5,442,464 | 8/1995 | Ito | 358/482 |
| 5,555,106 | 9/1996 | Hsu | 358/512 |

*Primary Examiner*—Edward L. Coles, Sr.
*Assistant Examiner*—Fan Lee

[57] ABSTRACT

The tonal resolution of an image scanner is improved by adjusting the dynamic range of an analog-to-digital converter of the scanner. A preview scan of the image is made. The image data from the preview scan is then analyzed to determine a maximum intensity and a minimum intensity. The value of the maximum intensity is used to set a white intercept of the image scanner such that a maximum digital value of the analog-to-digital converter corresponds to the maximum intensity present in the image data from the preview scan. The minimum intensity is used to set a black intercept of the image scanner such that the minimum intensity in the image data from the preview scan corresponds to the minimum digital number output by the analog-to-digital converter. Tonal resolution of the image scanner is optimized then by performing a final scan of the image with the analog-to-digital converter programmed to reflect the new white intercept and black intercept values.

15 Claims, 3 Drawing Sheets

SYSTEM AND METHOD FOR OPTIMIZING TONAL RESOLUTION IN AN OPTICAL SCANNER

BACKGROUND OF THE INVENTION

1. Field of the Invention

The invention relates generally to optical scanners, and more particularly, to a system and method for optimizing tonal resolution in an optical scanner.

2. Related Art

Optical scanners are used to capture and digitize images. For example, an optical scanner can be used to capture the image of printed matter such as text on a sheet of paper or a photograph. The digitized image can then be electronically stored for later use or processing. The typical optical scanner includes a light source, a linear array of photoelectric sensing elements (generally a CCD sensor), an analog amplifier, an analog-to-digital converter (ADC), a controller and a random access memory (RAM).

The CCD sensor includes a large number of (e.g., 2000) photoelectric sensing elements arranged in a linear array. Each photoelectric sensing element will capture light representing a single pixel of the image. The array will capture a line of pixels. By moving the CCD sensor across an object, the entire object can be scanned one line at a time.

The term "image light" is used herein to refer to light incident upon the CCD sensor. The image light may be reflected from an object or may be transmitted through the object. In either case, the light from the object, incident on the CCD sensor, is known as image light. The conversion into digital signals of image light reflected from or transmitted through the object takes place in essentially three steps. First, each photoelectric sensing element will convert the light which it receives into an electric charge. The magnitude of the charge will depend on the intensity of the light and the exposure time. Second, the charges from each of the photoelectric sensing elements are converted into analog voltages via the analog amplifier. Finally, the analog voltages are digitized by the analog-to-digital converter for digital image processing and storage.

In image scanning, one of the factors that impacts the tonal resolution and the resultant image quality from the scanner is the scanner's "white intercept." The white intercept is the intensity of image light which will result in a full scale output from the analog-to-digital converter of the scanner. For example, a scanner having an 8-bit analog-to-digital converter will return a maximum value of 255 if the image light has an intensity at or above the white intercept. Image light having an intensity 50% of the white intercept will cause the 8-bit ADC to return a value of 128 (assuming a black intercept, discussed below, of zero).

Similar in concept is the "black intercept." The black intercept is the intensity of the image light at which the analog-to-digital converter of the scanner will first return a value of zero (excluding noise). The bit depth of the analog-to-digital converter and the difference between the white and black intercepts will determine the tonal resolution of a scanner in reflectance or transmittance space. For ease of discussion, only reflectance is discussed herein. However, a person skilled in the relevant art will recognize that the invention has equal applicability to a scanner using transmittance.

A scanner with a white intercept of 100% reflectance, a black intercept of 0% reflectance and an 8-bit analog-to-digital converter, would have a tonal resolution of 0.39% reflectance. This value is calculated as a difference between the white intercept and the black intercept divided by the resolution of the analog-to-digital converter (e.g., 100% divided by $2^8$).

Conventionally, the black intercept of a scanner has been limited by noise, stray light, and CCD sensitivity. The white intercept is typically the result of design or calibration factors and is determined, for example, by the gain of the analog amplifier, the optical f-stop of the scanner optics, and the intensity of the lamp used in the scanner. After accounting for these factors, conventional scanners may set the white intercept to near 100% reflectance. This may appear optimal. However, in typical image scanning, most images have no regions where reflectance approaches 100% (even a white sheet of paper seldom gives 100% reflectance). In fact, many images will have a maximum reflectance of less than 80%. When using a scanner with a 100% white intercept to scan an image with a maximum reflectance of less than 80%, 20% of the available analog-to-digital levels are never used. Consequently, scanned images, particularly dark ones, suffer from quantization effects due to the limited number of analog-to-digital levels used in the scan.

A conventional approach to compensate for this shortcoming is to increase the resolution of the analog-to-digital converter by providing additional bits per pixel. For example, an 8-bit analog-to-digital converter might be replaced with a 10-bit analog-to-digital converter. Increasing the number of bits in the analog-to-digital converter, however, adds to the cost and complexity of the scanner and the amount of data that must be processed.

SUMMARY OF THE INVENTION

The invention is a system and method for optimizing the tonal resolution in an optical scanner. Tonal resolution is improved by adjusting the dynamic range of a digitally programmable analog-to-digital converter (ADC) in the scanner. By "dynamic range," it is meant the difference between the reference level (white intercept) and offset level (black intercept) in the ADC. By adjusting the gain of the ADC, the white intercept of the image capture system can be matched to the actual maximum intensity present in the image being captured. By adjusting the offset of the ADC, the black intercept of the image capture system can be adjusted to correspond to the actual minimum intensity in the image being captured.

The system of the invention includes a CCD sensor array, an analog amplifier, the ADC, a slave controller, a master controller, and a random access memory. The slave controller coordinates the CCD sensor, the ADC, and the memory. The slave controller includes an image processor that adjusts the dynamic range of the ADC based on the magnitudes of the analog voltages from the CCD sensor to optimize the tonal resolution of the image capture system.

To allow adjustability, the gain of the ADC is adjusted by a reference voltage and a directly applied offset. The reference voltage is controlled by a first digital-to-analog converter (DAC), and the offset voltage is controlled by a second DAC.

The method of the invention involves setting a gain of the ADC such that the nominal white intercept of the scanner is near 100% reflectance. This is based on a scan of a reference material of known reflectance. A preview scan of the object is then performed. Image data from the preview scan is analyzed to determine a maximum and minimum reflectance of the object. The white and black intercepts of the image capture system are then set based on the maximum and minimum reflectances determined in the preview scan.

In addition to optimizing the tonal resolution of the scanner, the dynamic range of the ADC may be intentionally set to exclude or "clip" certain reflectances in an image for artistic or image content specific reasons.

Once the white intercept and black intercept have been set by programming the ADC, a final scan of the image is performed. Any required image processing is performed on the image data by the image processor. If desired, the image data may be mapped back to the original white intercept and original black intercept to produce a facsimile of the original image. However, it may be desired to maintain the image data in its dynamically enhanced format. Finally, the image data is buffered in the random access memory and sent to a host computer.

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENT

The preferred embodiment of the invention is discussed in detail below. While specific part numbers and/or configurations are discussed, it should be understood that this is done for illustration purposes only. A person skilled in the relevant art will recognize that other components and configurations may be used without parting from the spirit and scope of the invention.

The preferred embodiment of the invention is now described with reference to the figures where like reference numbers indicate like elements. Also in the figures, the left most digits of each reference number corresponds to the figure in which the reference number is first used.

Figure 1:
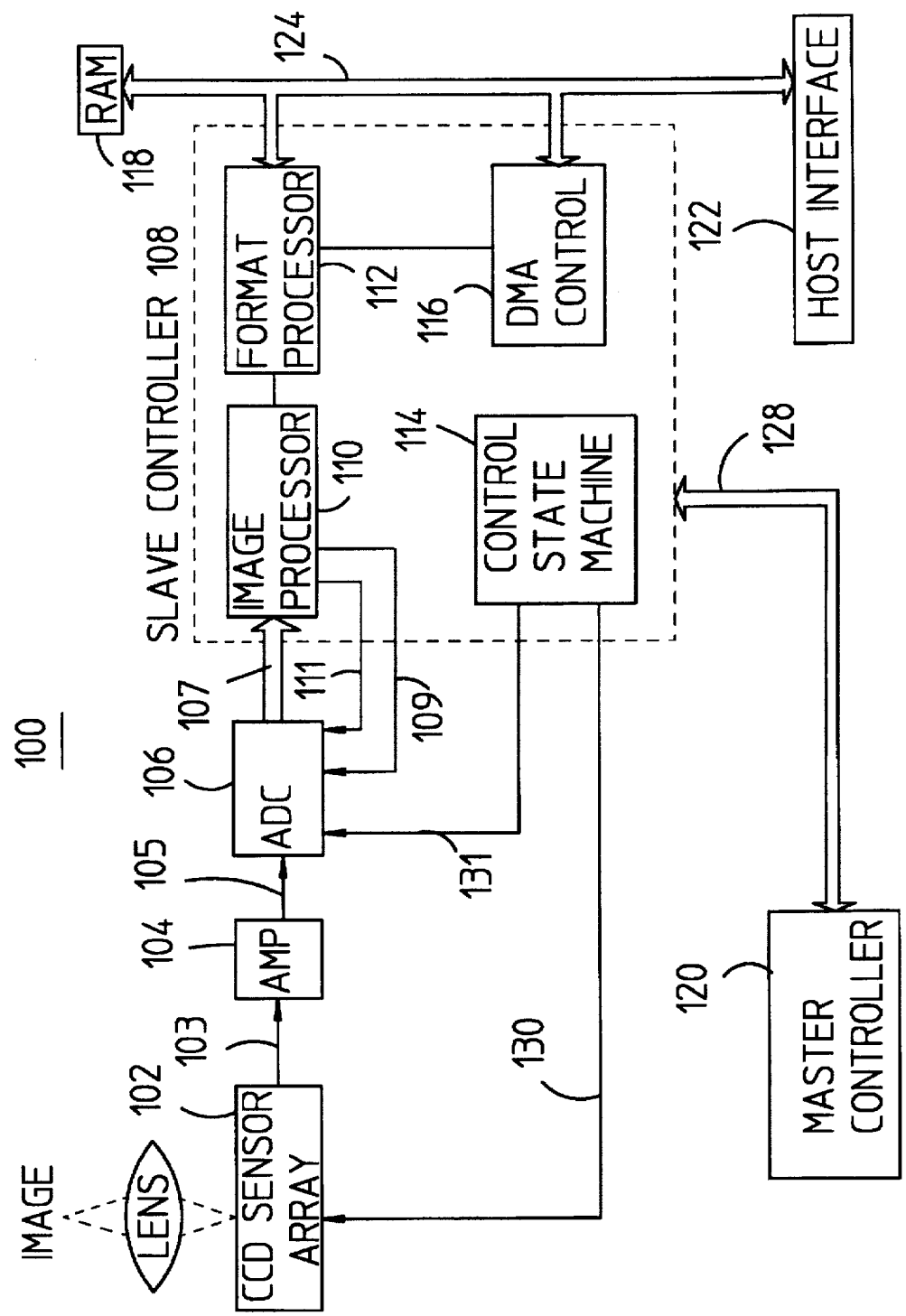
FIG. 1 is a high level block diagram of the image capture system of the invention.

FIG. 1 is a high level block diagram of an image capture system 100 of the invention. Image capture system 100 may be used with an optical scanner such as that described in commonly owned U.S. Pat. No. 4,926,041 to Boyd, the full text of which is incorporated herein by reference as if reproduced in full below.

Image capture system 100 includes a CCD (charge coupled device) sensor 102, an analog amplifier 104, a programmable analog-to-digital converter (ADC) 106, a slave controller 108, a master controller 120, a random access memory (RAM) 118 and a host interface 122. CCD sensor 102 includes a linear array of photoelectric sensing elements. Each element is configured to capture a pixel of an image and to produce an electrical charge corresponding to the intensity of light received.

Analog amplifier 104 is configured to receive a serial stream of charges from CCD sensor 102 over a line 103 and to sequentially convert each charge to an analog voltage. ADC 106 is configured to receive an analog voltage from amplifier 104 over a line 105 and to digitize the analog voltage. For example, ADC 106 may output an 8-bit digital word representing the varying gray scale of the pixel represented by the received voltage.

Slave controller 108 controls the timing of CCD sensor 102 and ADC 106 over control lines 130,131. Slave controller 108 receives the digitized data from ADC 106 over bus 107, provides any required formatting and/or image processing and stores the digitized data in RAM 118 via a bus 124. In addition, slave controller 108 manages the transfer of data from RAM 118 to a host (not shown) such as an image processing system or general purpose computer system via host interface 122. Master controller 120 is provided to initiate an image scanning operation and to set up and supervise slave controller 108 via bus 128.

Slave controller 108 includes an image processor 110, a format processor 112, a control state machine 114 and a direct memory access (DMA) controller 116. Control state machine 114 provides clocking and other control signals to synchronize operation of CCD sensor 102 via control lines 130 and ADC 106 via control lines 131. Control state machine 114 also controls the scanning of CCD sensor 102 across an image.

DMA controller 116 controls the storage and removal of data from RAM 118. DMA controller 116 communicates with RAM 118 and host interface 122 via bus 124. Image processor 110 provides image processing capabilities to image capture system 100. For example, image processor 110 may alter the resolution of the digitized image from ADC 106. Format processor 112 allows the data format of the digitized image to be changed prior to being stored in RAM 118 via bus 124. For example, format processor 112 may present the data representing the digitized image to RAM 118 in 1, 4, or 8 bits per pixel format. Format processor 112 also communicates with a host via bus 124.

Exchange of data between RAM 118 and the host computer via bus 124 is discussed in detail in commonly owned U.S. Pat. No. 5,239,387 to Stein et al., the full text of which is incorporated herein by reference as if reproduced in full below.

In the preferred embodiment, slave controller 108 is implemented as an ASIC (application specific integrated circuit). Master controller 120 is a general purpose microprocessor such as a Motorola 68HC11, available from Motorola, Inc., Schaumburg, Ill. CCD sensor 102 is a part number TCD1504C, available from Toshiba America Electronic Components, Inc., Irvine, Calif. These specific components are provided by way of example and not limitation. A person skilled in the relevant art will recognize that a variety of different components and configuration may be used to implement image capture system 100 without departing from the scope and spirit of the invention.

The present invention provides enhanced tonal resolution by adjusting the dynamic range of ADC 106. By "dynamic range," it is meant the difference between the reference and offset levels in the ADC. ADC 106 is an analog-to-digital converter with a programmable gain and a programmable offset. The gain is set by a reference voltage supplied by image processor 110 via a control line 111. The offset of ADC 106 is set by image processor 110 via a control line 109. In an alternate embodiment, these controls might be combined with other controls to correct non-uniform CCD cells or illumination levels. By adjusting the gain of the ADC, the white intercept of the image capture system can be matched to the actual maximum reflectance (intensity) present in the image being captured. By adjusting the offset of the ADC, the black intercept of the image capture system can be adjusted to correspond to the actual minimum reflectance in the image being captured. In this manner, the white and/or black intercepts are adjusted to match the available ADC levels to the range of light intensities from an image.

Figure 2:
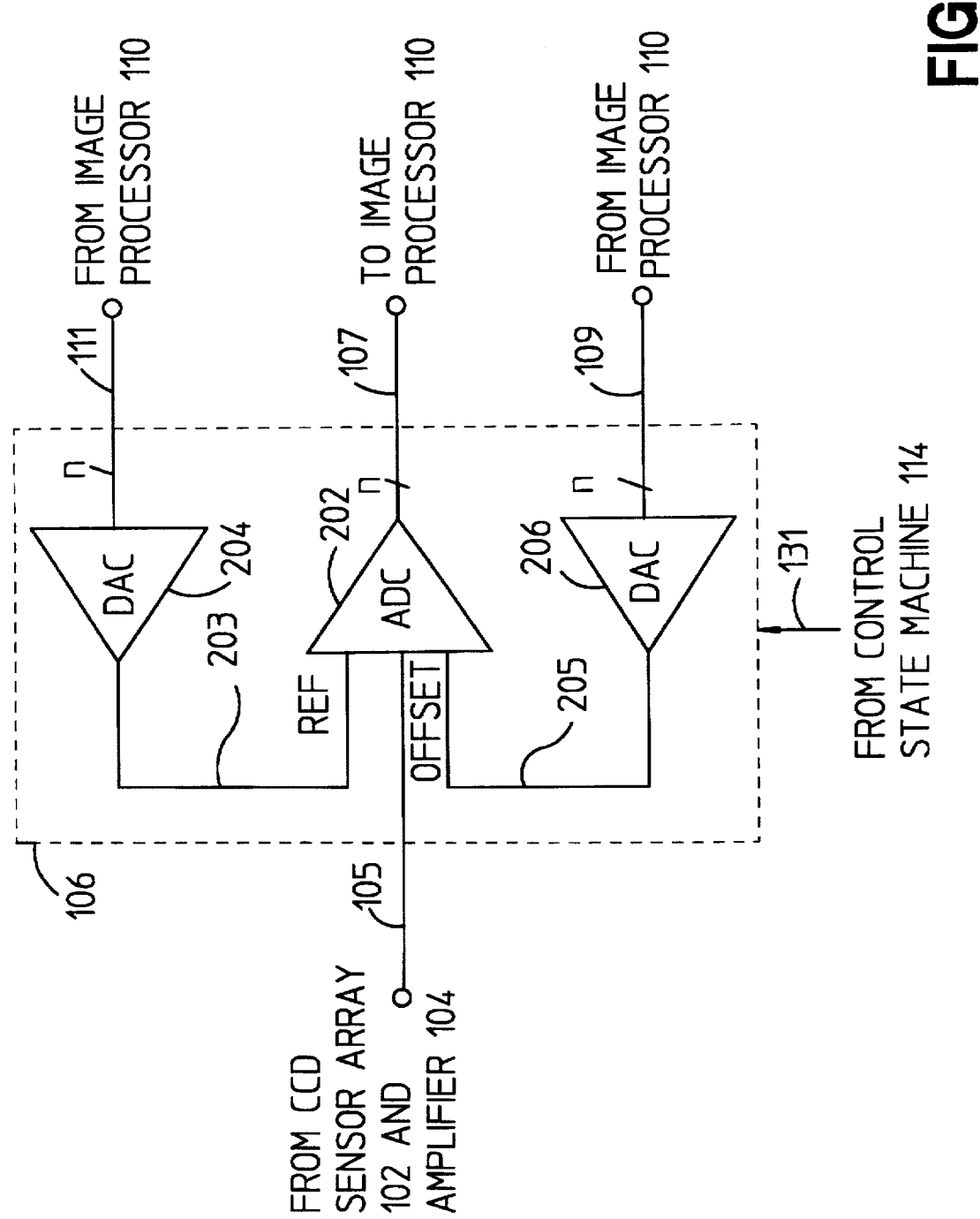
FIG. 2 shows the programmable analog-to-digital converter in greater detail.

ADC 106 is illustrated in greater detail in FIG. 2. As illustrated, ADC 106 includes a programmable analog-todigital converter (ADC) 202 and digital-to-analog converters (DACs) 204 and 206. Programmable ADC 202 receives an analog voltage from CCD sensor array 102 via line 103, amplifier 104 and line 105. Programmable ADC 202 digitizes the analog voltage and outputs a digital number representing the analog voltage. For example, programmable ADC 202 may output an 8-bit digital word. With 8 bits, programmable ADC 202 would have 256 ADC levels (0–255) available for the representation of the analog voltage on line 105. The digital value output by programmable ADC 202 is provided to image processor 110 via line 107.

Programmable ADC 202 includes a programmable offset. An offset voltage on line 205 is subtracted from the analog voltage on line 105 before programmable ADC 202 adjusts its gain and digitizes the analog voltage. The offset voltage on line 205 is set by DAC 206. DAC 206 is controlled by image processor 110 via line 109. Image processor 110 controls the offset voltage on line 205 by placing a digital number (e.g., an 8-bit value) on control line 109.

Programmable ADC 202 also includes an adjustable gain. The gain is adjusted as follows. Programmable ADC 202 compares the analog voltage on line 105 to a reference voltage on line 203. The reference voltage on line 203 represents the maximum level (e.g., digital number 255 for an 8-bit converter) output by programmable ADC 202. For example, if the reference voltage is 5 volts on line 203, then a 5-volt signal on line 105 will result in a maximum output of programmable ADC 202. Similarly, if the reference voltage is 5 volts, then a voltage of 2.5 volts on line 105 will result in programmable ADC 202 outputting a value one-half of its maximum value (e.g., a digital value of 128), assuming a zero offset. Thus, the reference voltage on line 203 sets the gain of programmable ADC 202.

The reference voltage on line 203 is set by DAC 204. DAC 204 is controlled by image processor 110 via control line 111. Thus, a digital signal (e.g., an 8-bit signal representing a desired gain) output from processor 110 is converted to an analog reference voltage by DAC 204.

Thus, ADC 106 is a digitizer having a programmable gain and offset. The gain and offset are controlled by digital numbers supplied by image processor 110 via control lines 109,111. As discussed above, control state machine 114 provides clocking and control signals to ADC 106 via control lines 131. Programmable analog to digital converters suitable for use as ADC 106 are commercially available and may be obtained, for example, from Micro Power Systems, San Jose, Calif.

Figure 3:
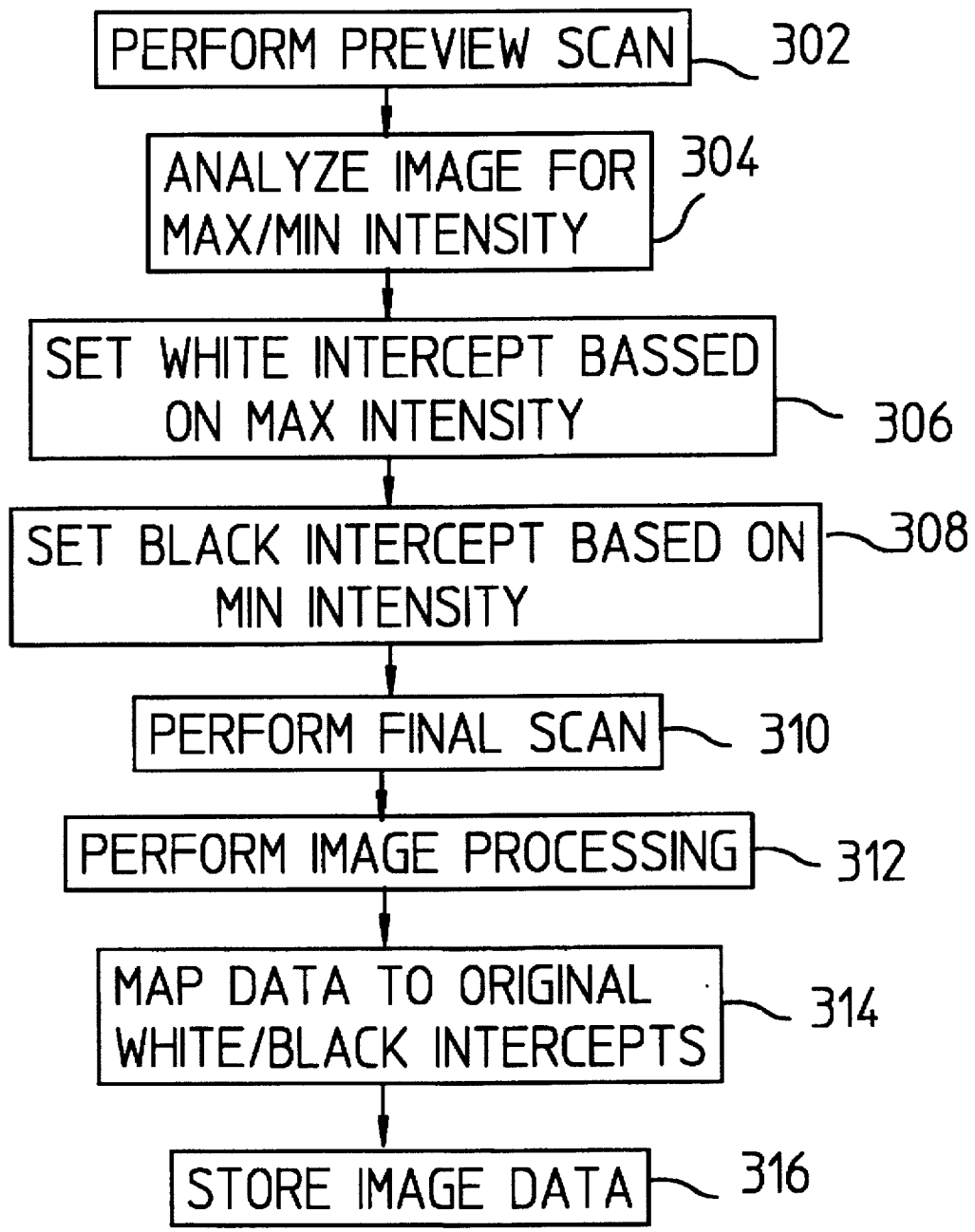
FIG. 3 is a flow diagram illustrating operation of the image capture system of the invention.

Operation of image capture system 100 is now described with reference to FIG. 3. In a step 302, a preview scan of the image is performed. The preview scan determines the maximum and minimum reflectances (intensities) of the image light. This is accomplished as follows. In the preferred embodiment, image capture system 100 scans a calibrated reference strip having, for example, approximately 50% reflectance. Image processor 110 then adjusts the gain of ADC 106 so that the converted value of the calibrated reference strip is approximately half-scale (to match the reflectance of the reference strip). A preview scan of the object is then performed with this gain programmed into ADC 106.

In a step 304, the reflectances of the image light resulting from the preview scan are analyzed. First, the data output by ADC 106 and representing the image light is analyzed by either image processor 110 or the host computer (not shown) to determine a maximum intensity. Next, the data output by ADC 106 and representing the image reflectance is analyzed by image processor 110 to determine a minimum intensity. Analyzing the image for maximum and minimum intensities may involve looking at the entire image or merely a region of interest in the image. Alternatively, the location in the image of the desired white/black intercept may be selected by a user. That is, the user may indicate that a particular feature in the image should be treated as the white/black intercept even if those features are not the minimum/maximum reflectances.

In a step 306, the white intercept of image capture system 100 is set based on the maximum intensity determined at step 304. The white intercept is set by image processor 110 adjusting the gain of ADC 106 such that the maximum intensity measured at step 304 corresponds to a maximum digital number output by ADC 106.

At step 308, the black intercept of image capture system 100 is set based on the minimum intensity determined at step 304. For example, the minimum intensity is mapped to the smallest digital number (e.g., 0) output by ADC 106. The black intercept is set by image processor 110 via control line 109, by adjusting the offset of programmable ADC 202.

In a step 310, a final scan of the image is performed with the dynamic range (i.e., gain and offset) of ADC 106 set to optimize the digital range of ADC 106 to the intensity range of the image light. This results in an optimization of the image being scanned.

In a step 312, any desired image processing is performed by image processor 110. As illustrated in step 314, this may optionally include mapping the image data to the original white intercept and original black intercept such that an accurate facsimile of the original image is produced. This step of mapping, however, is optional. It may be desirable to skip this mapping step and leave the image data in the new format, thereby adjusting the tone of the image.

Finally, in a step 316, the image data is buffered in RAM 118 before being sent to a host computer (not shown) via host interface 122. This completes capture of the image by image capture system 110.

An example calibration of ADC 106 is provided below. First, assuming a calibrated reference strip having approximately 50% reflectance, the gain of ADC 106 is adjusted (by adjusting the reference voltage of ADC 106) so that image light from the calibrated reference strip results in a desired half-scale output by ADC 106. The preview scan of the image is then performed with ADC 106 set at this calibrated setting.

After the preview scan, the image data is analyzed to determine its maximum reflectance. For purposes of illustration, assume that a maximum reflectance of 80% is returned from the preview scan. Image capture system 100 may then be programmed to map the 80% reflectance to a nominal 100% reflectance. This is performed by multiplying the reference voltage used in the preview scan by the maximum reflectance of the image to compute a new reference voltage as follows:

$$V_{New} = V_{Ref} \cdot \frac{I_{max}}{2^N}$$
$$= 5.0V \cdot \frac{205}{256} = 4.0V$$

where:

$V_{new}$ the reference voltage required to optimize the gain of ADC 106 as a result of the preview scan;

$V_{Ref}$=the reference voltage set using the calibrated reference strip; and $I_{max}$=the maximum intensity (in counts) of the image light from the preview scan; and N=the bit depth of ADC 106 (e.g., 8 bits in the example). Note that $I_{max}/2^N$ yields the percent maximum reflectance in the digital domain (e.g., 205 counts divided by 256 counts equals 80%).

For the example, if $V_{Ref}$ is equal to 5.0 volts and $I_{max}$ is equal to 205, then $V_{New}$ is equal to 4.0 volts. If amplifier 104 then puts a voltage of 4.0 volts (representing the maximum reflectance of the image) on line 105 during a capture of the image, then ADC 106 will output a maximum digital value (e.g., 255 counts for an 8 bit ADC). Thus, all 256 levels of ADC 106 are applied to the actual content of the image being scanned or captured. This significantly increases the tonal resolution in the captured image without increasing the number of bits required in ADC 106.

A similar scheme is used to set the black intercept. Prior to performing the preview scan, a scan is made without the imaging lamp being turned on. With no light present, the output of CCD sensor array 102 is measured. This output, known as a dark current, represents leakage of CCD sensor array 102. Prior to performing the preview scan, the offset of ADC 106 is adjusted to zero out (i.e., adjust the offset of ADC 106 so that the leakage will produce a zero output) or compensate for the leakage current. The preview scan is then performed as discussed above.

The preview scan will return a minimum intensity value for the image light. Knowing the gain used during the preview scan and the minimum intensity value (as output from ADC 106), image processor 110 or master controller 120 can calculate an offset. For example, if the reference voltage on line 111 is equal to 5.0 volts, the minimum intensity value is equal to 25 counts from ADC 106 and the offset due to the dark current is equal to 0.1 volts, then the offset voltage is calculated as follows:

$$V_{offset} = \left[ V_{ref} \times \frac{I_{min}}{2^N} \right] + V_{darkoffset}$$

$$= 5V \times \frac{25 \text{ counts}}{256} + 0.1V = 0.50 \text{ Volts}$$

where:

$V_{offset}$=the offset voltage on control line 109;

$I_{min}$=the minimum intensity (in counts) of the image light from the preview scan;

N=the bit depth of ADC 106 (e.g., 8 bits in the example); and $V_{dark\ offset}$=offset due to the dark current.

Setting the offset voltage according to this method will cause the minimum intensity of the image light to appear as a minimum value (e.g., zero) output by ADC 106.

For purposes of illustration, the invention has been described in the environment of an image capture system having a single "channel." That is, a single CCD sensor 102, amplifier 104 and ADC 106. Such an embodiment could be used in a single color (e.g., black and white) image scanner. In the preferred embodiment, the invention is implemented in a color scanner having three channels: a red channel, a green channel and a blue channel.

While the invention has been particularly shown and described with reference to several preferred embodiments thereof, it will be understood by those skilled in the art that various changes in form and details may be made therein without departing from the spirit and scope of the invention as defined in the appended claims.

What is claimed is:

1. A method for capturing an image with enhanced tonal resolution, comprising the steps of:

performing a preview scan of the entire image to be scanned with an image capture system;

determining a maximum pixel intensity of at least a portion of the preview-scanned image;

determining a minimum pixel intensity of at least a portion of the preview-scanned image;

adjusting a dynamic range of the image capture system based on said maximum pixel intensity and said minimum pixel intensity, wherein a gain of a digitizer is adjusted, based on said maximum pixel intensity, and an offset of said digitizer is adjusted based on said minimum pixel intensity, to modify a dynamic range of said digitizer and improve the tonal resolution of the object scanner; and scanning the image with the adjusted image capture system, whereby the tonal resolution of the scanned image is increased.

2. The method of claim 1, wherein said performing step comprises:

scanning a reference image;

preview adjusting said dynamic range of the image capture system to output a desired intensity based on said reference image; and performing said preview scan of the image with the preview adjusted image capture system.

3. The method of claim 1, wherein said adjusting step comprises:

adjusting a gain of a digitizer of the image capture system so that said maximum pixel intensity corresponds to a maximum digital value being output from said digitizer.

4. The method of claim 1, wherein said step of adjusting said dynamic range of the image capture system based on said minimum pixel intensity comprises:

adjusting an offset of said digitizer of the image capture system so that said minimum pixel intensity results in a minimum digital value being output from said digitizer.

5. The method of claim 4, wherein said step of adjusting a dynamic range of a digitizer of the image capture system based on said maximum pixel intensity comprises:

adjusting a gain of said digitizer of the image capture system so that said maximum pixel intensity corresponds to a maximum digital value being output from said digitizer.

6. A method for improving tonal resolution of an object scanner, comprising the steps of:

setting a gain of a digitizer of the object scanner to a preview value;

performing a preview scan of an entire object to be scanned;

determining a maximum reflectance of at least a portion of the preview-scanned object;

determining a minimum reflectance of at least a portion of the preview-scanned object;

adjusting, based on said maximum reflectance, said gain of said digitizer, and adjusting, based on said minimum reflectance, an offset of said digitizer, thereby modifying a dynamic range of said digitizer to improve the tonal resolution of the object scanner; and scanning said object with said adjusted object scanner.

7. The method of claim 6, wherein said gain adjusting step comprises:

adjusting said gain of said digitizer so that said maximum reflectance results in a maximum value being output from said digitizer.

8. The method of claim 6, wherein said offset adjusting step comprises:

adjusting an offset of said digitizer so that said minimum reflectance results in a minimum value being output from said digitizer.

9. The method of claim 8, wherein said gain adjusting step comprises:

adjusting said gain of said digitizer so that said maximum reflectance results in a maximum value being output from said digitizer.

10. An image capture system with enhanced tonal resolution, comprising:

a charge coupled device sensor configured to produce a plurality of charges in response to light incident thereon;

amplifier means for receiving said charges and for converting said charges to analog voltages;

digitizer means for digitizing said analog voltages to produce digitized voltages; and control means for coordinating and controlling said charge coupled device sensor and said digitizer means, said control means including optimization means for adjusting a dynamic range of said digitizer means based on magnitudes of said analog voltages to optimize the tonal resolution of the image capture system, wherein said optimization means comprises means for adjusting a gain of said digitizer means based on a maximum magnitude of said digitized voltages and means for adjusting an offset of said digitizer means based on a minimum magnitude of said digitized voltages, wherein said maximum magnitude of said digitized voltages represents a maximum pixel intensity of at least a portion of an image to be scanned, and wherein said minimum magnitude of said digitized voltages represents a minimum pixel intensity of at least a portion of an image to be scanned.

11. The image capture system of claim 10, further comprising:

memory means for storing said digitized voltages.

12. A system for capturing an image of an object with enhanced tonal resolution, comprising:

a charge coupled device sensor to receive light from said image and to produce electric charges corresponding to an intensity of the received light;

an amplifier electrically connected to receive said electric charges from said sensor and to produce analog voltages representing intensities of said light;

a digitizer electrically connected to digitize said analog voltages; and control means for adjusting a gain and offset of said digitizer as a function of magnitudes of said analog voltages to optimize a dynamic range of said digitizer for the capture of said image, wherein said control means comprises means for adjusting a gain of said digitizer based on a maximum magnitude of said analog voltages and means for adjusting an offset of said digitizer based on a minimum magnitude of said analog voltages, wherein said maximum magnitude of said analog voltages represents a maximum pixel intensity of at least a portion of an image to be scanned, and wherein said minimum magnitude of said digitized voltages represents a minimum pixel intensity of at least a portion of an image to be scanned.

13. The system of claim 12, further comprising:

memory means for storing said digitized voltages.

14. A system for capturing an image with enhanced tonal resolution, comprising:

means for performing a preview scan of the entire image to be scanned with an image capture system;

means for determining a maximum pixel intensity of at least a portion of the preview-scanned image;

means for determining a minimum pixel intensity of at least a portion of the preview-scanned image;

means for adjusting a gain of said digitizer based on a maximum pixel intensity and for adjusting an offset of said digitizer based on a minimum pixel intensity to adjust a dynamic range of the image capture system; and means for scanning the image with the adjusted image capture system, whereby the tonal resolution of the scanned image is increased.

15. A system for improving tonal resolution of an object scanner, comprising:

means for setting a gain of a digitizer of the object scanner to a preview value;

means for performing a preview scan of an entire object to be scanned;

means for determining a maximum reflectance of at least a portion of the preview-scanned object;

means for determining a minimum reflectance of at least a portion of the preview-scanned object;

means for adjusting, based on said maximum reflectance, said gain of said digitizer, and adjusting, based on said minimum reflectance, an offset of said digitizer, thereby modifying a dynamic range of said digitizer to improve the tonal resolution of the object scanner; and means for scanning said object with said adjusted object scanner.

* * * * *